United States Patent
Ho et al.

(10) Patent No.: US 10,423,253 B2
(45) Date of Patent: Sep. 24, 2019

(54) HANDHELD ELECTRONIC APPARATUS, TOUCH SENSOR AND TOUCH DETECTION METHOD THEREOF

(71) Applicant: HTC Corporation, Taoyuan (TW)

(72) Inventors: Chia-Chu Ho, Taoyuan (TW); Hao-Tien Yen, Taoyuan (TW); Shih-Hung Chang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/910,012

(22) Filed: Mar. 2, 2018

(65) Prior Publication Data

US 2018/0307339 A1  Oct. 25, 2018

Related U.S. Application Data

(60) Provisional application No. 62/487,490, filed on Apr. 20, 2017.

(51) Int. Cl.
| | |
|---|---|
| *G06F 3/041* | (2006.01) |
| *G06F 1/3296* | (2019.01) |
| *G06F 1/3231* | (2019.01) |
| *G06F 1/3234* | (2019.01) |
| *G06F 1/3287* | (2019.01) |

(52) U.S. Cl.
CPC ............ *G06F 3/041* (2013.01); *G06F 1/325* (2013.01); *G06F 1/3231* (2013.01); *G06F 1/3262* (2013.01); *G06F 1/3287* (2013.01); *G06F 1/3296* (2013.01); *G06F 3/0416* (2013.01); *G06F 3/0414* (2013.01); *G06F 2203/04105* (2013.01)

(58) Field of Classification Search
None
See application file for complete search history.

(56) References Cited

U.S. PATENT DOCUMENTS

2010/0079395 A1* 4/2010 Kim ................ G06F 1/1626
  345/173
2011/0304559 A1* 12/2011 Pasquero ............ G06F 3/016
  345/173

* cited by examiner

*Primary Examiner* — Nicholas J Lee
(74) *Attorney, Agent, or Firm* — JCIPRNET

(57) ABSTRACT

Provided is a handheld electronic apparatus, a touch sensor, and a touch detection method thereof. The touch sensor includes a substrate, a strain gauge, a plurality of piezo sensors, and a touch layer. The substrate has a first surface and a second surface opposite to the first surface. The strain gauge is disposed on the first surface of the substrate. The piezo sensors are disposed on the second surface. The touch layer covers a plurality of piezo sensors and the strain gauge.

13 Claims, 5 Drawing Sheets

HANDHELD ELECTRONIC APPARATUS, TOUCH SENSOR AND TOUCH DETECTION METHOD THEREOF

CROSS-REFERENCE TO RELATED APPLICATION

This application claims the priority benefit of U.S. provisional application Ser. No. 62/487,490, filed on Apr. 20, 2017. The entirety of the above-mentioned patent application is hereby incorporated by reference herein and made a part of specification.

BACKGROUND OF THE INVENTION

Field of the Invention

The invention is related to a hand-held electronic apparatus, a touch sensor and a touch detection method thereof.

Description of Related Art

In existing mobile devices, touch technology has been widely applied to various hand-held electronic apparatuses such as mobile phone, digital camera, tablet PC and so on. In recent years, the concept of edge sense has been applied to consumer electronic products. Users can use various gestures to directly activate functions such as photographing, multi-media operation and so forth of hand-held electronic apparatus through edge sensor.

However, when performing detection through the edge sensor, since the edge sensor keeps scanning, power consumption is increased and the battery sustainability of the hand-held electronic apparatus is reduced.

SUMMARY OF THE INVENTION

The invention provides a hand-held electronic apparatus, a touch sensor and a touch detection method thereof. The hand-held electronic apparatus and the touch sensor thereof have low-power mode for reducing power consumption of the hand-held electronic apparatus.

A touch sensor provided in the invention includes a substrate, a strain gauge, a piezo sensor and a touch layer. The substrate has a first surface and a second surface opposite to the first surface. The strain gauge is disposed on the first surface of the substrate. The plurality of piezo sensors are disposed on the second surface of the substrate. The touch layer covers the plurality of piezo sensors and the strain gauge.

A hand-held electronic apparatus provided in the invention includes a housing and a plurality of touch sensors. The plurality of touch sensors are disposed on at least one lateral side of the housing.

A touch detection method provided in the invention includes the following steps. A substrate is provided, and the substrate has a first surface and a second surface opposite to the first surface. A strain gauge is provided, and the strain gauge is disposed on the first surface of the substrate. A plurality of piezo sensors are provided, and the plurality of piezo sensors are disposed on the second surface of the substrate. A touch layer is provided, and the touch layer covers the plurality of piezo sensors and the strain gauge.

According to the above, the touch sensor provided in the invention has the strain gauge and the plurality of piezo sensors, wherein the strain gauge and the piezo sensors are respectively configured to detect touch pressure from different directions to generate touch detection result effectively.

In order to make the aforementioned features and advantages of the invention more comprehensible, embodiments accompanying figures are described in detail below.

DESCRIPTION OF EMBODIMENTS

Figure 1:
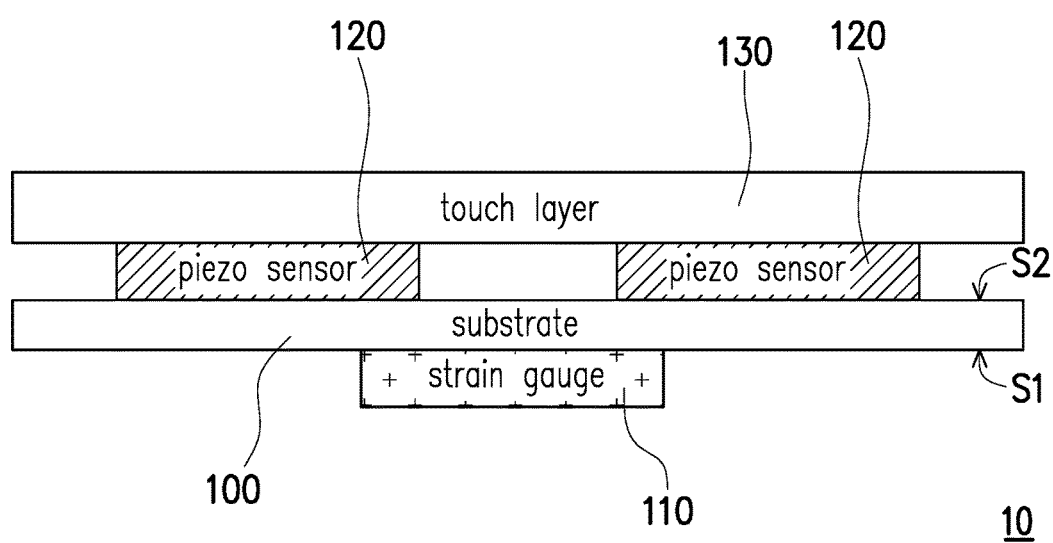
FIG. 1 is a schematic view of a touch sensor according to an embodiment of the invention.

Referring to FIG. 1, FIG. 1 is a schematic view of a touch sensor according to an embodiment of the invention. A touch sensor 10 may be disposed at any position of any electronic apparatus; for example, the touch sensor 10 may be disposed on a lateral side of a hand-held electronic apparatus. The touch sensor 10 includes a substrate 100, a strain gauge 110, a plurality of piezo sensors 120 and a touch layer 130.

According to an embodiment of the invention, the substrate 100 may have a first surface S1 and a second surface S2 opposite to the first surface S1. The substrate 100 may be a circuit substrate such as a printed circuit board or other circuit substrate known to persons of ordinary skill in the art; the invention provides no limitation thereto.

The strain gauge 110 is disposed on the first surface S1 of the substrate 100, the piezo sensor 120 may be disposed on the second surface S2 of the substrate 100. Meanwhile, the piezo sensor 120 may be covered by the touch layer 130. In the embodiment, the touch layer 130 is configured to receive the pressure applied externally through physical means. Through the process of transmitting pressure, the piezo sensor 120 and the strain gauge 110 can receive the pressure applied on the touch layer 130. The piezo sensor 120 and the strain gauge 110 respectively generate a piezo detecting signal and a strain detecting signal according to the received pressure.

Regarding the above, the strain gauge 110 may be deformed according to the received pressure and change the resistance that can be generated according to the deformation. In this manner, the strain gauge 110 may provide the corresponding strain detecting signal (i.e., first detection result) according to the change of the provided resistance.

On the other hand, the piezo sensor 120 is configured to detect the pressure applied on the touch layer 130 along a specific direction through the physical means. The piezo sensor 120 may generate kinetic energy according to the received pressure and generate the piezo detecting signal (i.e., second detection result) by converting the kinetic energy.

Regarding the above, the second detection result represents a touch status along a first direction and a second direction obtained by the touch sensor 100. The first detection result represents a touch status along a third direction obtained by the touch sensor 100. Take a coordinate axis as an example, the first direction, the second direction and the third direction may be X-axis, Y-axis and Z-axis respectively on the coordinate axis. That is to say, any two of the first direction, the second direction and the third direction are perpendicular to each other.

It should be mentioned that the substrate 100 may be a circuit substrate, and the first detection result and the second detection result may be transmitted through a plurality of conductive lines L1, L2 and L3 respectively disposed on the first surface S1 and the second surface S2 of the substrate 100. In the embodiment of the invention, the conductive line for transmitting the detection result may be coupled to a control device (not shown). The control device may calculate and analyze the received first detection result and the second detection result and perform corresponding operation.

It should be noted that, referring to FIG. 1, in an embodiment, on the second surface, i.e., upper surface, of the substrate 100, the plurality of piezo sensors 120 are not in contact with each other and spaced apart by a predetermined distance. The invention provides no fixed limitation to the predetermined distance, which may be set and adjusted by designer depending on the actual need. Additionally, the piezo sensor 120 and the strain gauge 110 may not be overlapped or partially overlapped with each other. The invention provides no fixed limitation to the relative position relation between the piezo sensor 120 and the strain gage 110, which may be set and adjusted by designer depending on the actual need.

In the embodiment of the invention, the touch layer 130 may be, for example, a metal plate formed of any metal material; the invention provides no limitation thereto.

Figure 2:
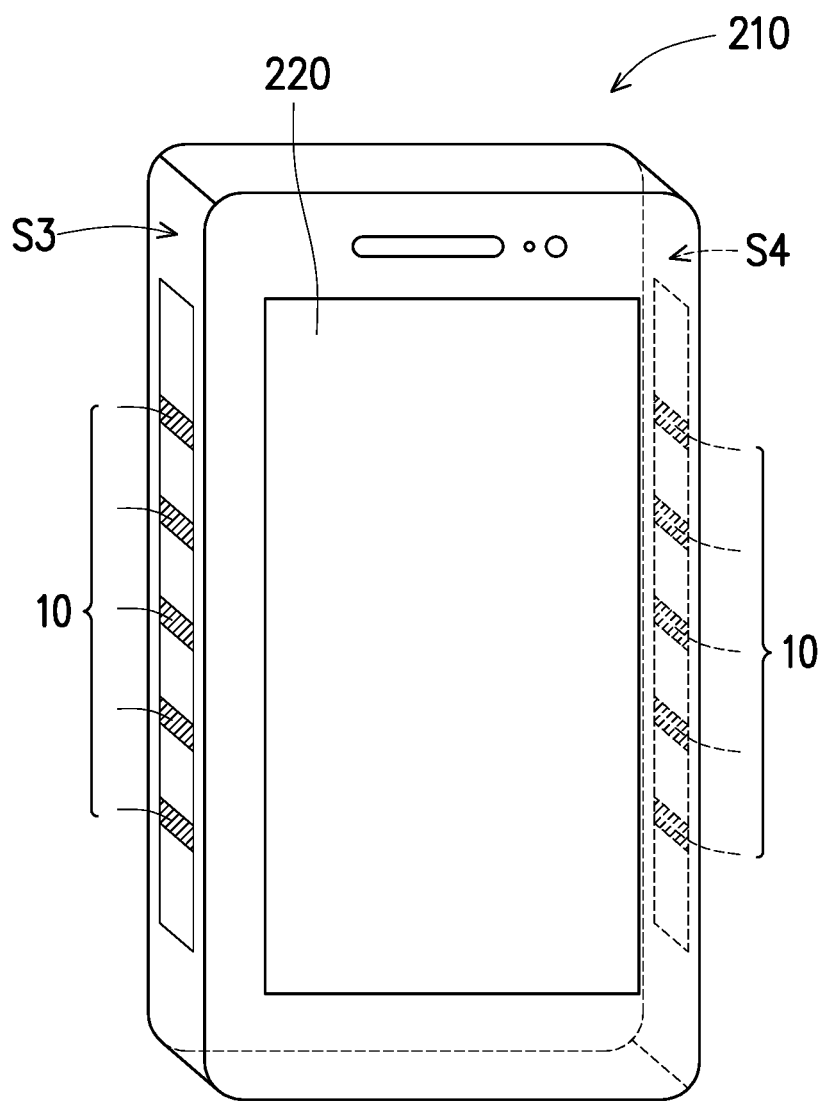
FIG. 2 is a schematic view of a hand-held electronic apparatus according to an embodiment of the invention.

Referring to FIG. 2, FIG. 2 is a schematic view of a hand-held electronic apparatus according to an embodiment of the invention. A hand-held electronic apparatus 200 has a housing 210, a plurality of touch sensors 10 and a display 220. The housing 210 is the case portion of the hand-held electronic apparatus 200, the invention provides no limitation to the material and structure of the housing 210. In the embodiment, the plurality of touch sensors 10 may be disposed on a lateral side S3 and a lateral side S4 of the housing 210, wherein the lateral side S3 and the lateral side S4 are opposite to each other. However, the invention provides no limitation to the number and position of the plurality of touch sensors 10. In other embodiments, the plurality of touch sensors 10 may be disposed on any lateral side of the hand-held electronic apparatus 200. The display 220 has display function and disposed on the surface of the hand-held electronic apparatus 200.

It should be indicated that, in an embodiment, the hand-held electronic apparatus 200 has power-saving mode. The power-saving mode may, for example, provide lower operation frequency and less operation element to reduce power consumption of the hand-held electronic apparatus 200. The power-saving mode is applicable in the following circumstances, for example, the user neither performs touch operation on the hand-held electronic apparatus 200 for a predetermined period of time nor executes application program such as multi-media playing operation.

In the power-saving mode, the strain gauge 110 of the touch sensor 10 may be maintained in an activated status to generate a strain detecting value to detect surrounding environment. Moreover, the piezo sensor 120 may be maintained in a closed status to save power consumption.

In the power-saving mode, when the strain gauge 110 detects movement from the environment or the user, for example, within a fixed time interval, it may be determined whether the strain detecting signal is a valid strain detecting signal according to whether the strain detecting signal transmitted by the strain gauge 110 is larger than a predetermined threshold value. Also, a command may be sent according to a valid touch detecting value to drive the hand-held electronic apparatus 200 to perform corresponding operation. The predetermined threshold value may be set by the designer depending on actual application, and the invention provides no limitation thereto.

In an embodiment, when the strain detecting vague is valid, it may be determined that the hand-held electronic apparatus 200 is in use; accordingly, the hand-held electronic apparatus 200 is switched from the power-saving mode to the normal mode. In the normal mode, the plurality of piezo sensors 120 are activated to generate the piezo detecting value for detecting the user's gesture and reporting the position which the user's finger presses.

It should be noted that, when entering the normal mode, the plurality of piezo sensors 120 of the touch sensor 10 may be activated simultaneously, sequentially, completely or partially, the invention provides no limitation to the number and sequence of the piezo sensor 120 that is activated.

Figure 3:
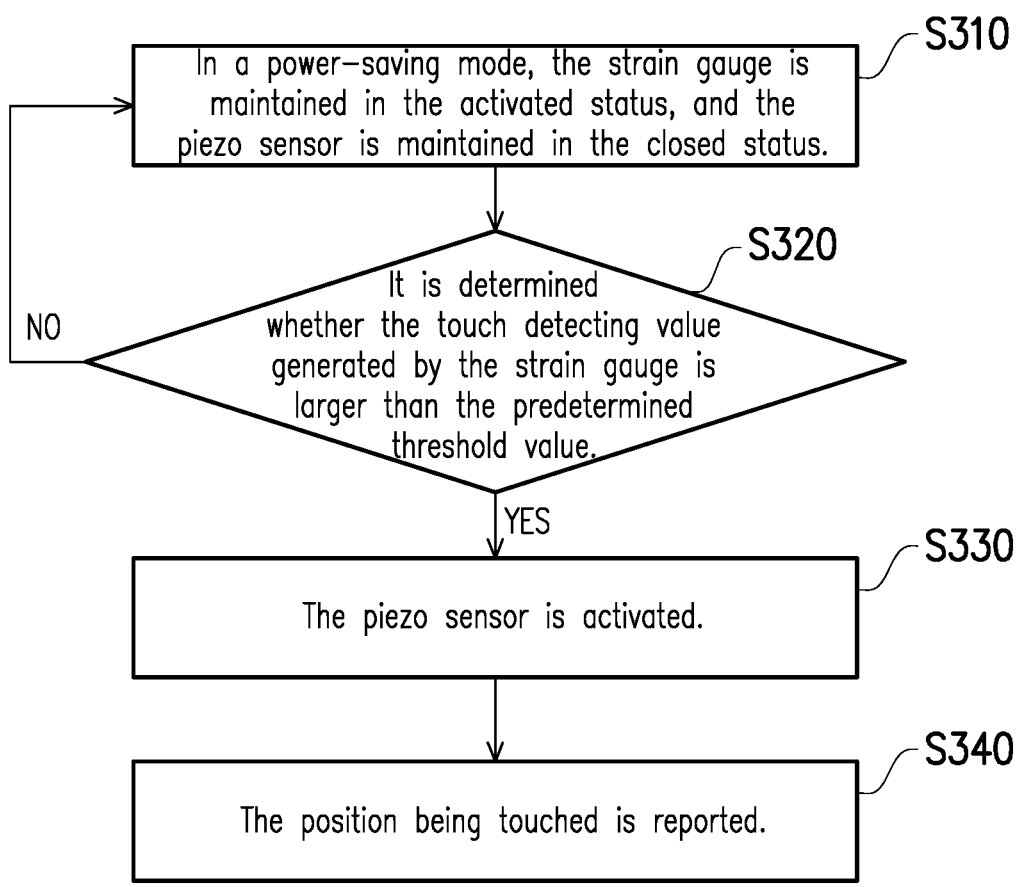
FIG. 3 is a flowchart illustrating that a touch sensor performs touch detection in power-saving mode according to an embodiment of the invention.

Referring to FIG. 3, FIG. 3 is a flowchart illustrating that a touch sensor performs touch detection in power-saving mode according to an embodiment of the invention. In step S310, in the power-saving mode, the strain gauge 110 is maintained in the activated status, and the piezo sensor 120 is maintained in the closed status. In step S320, it is determined whether the touch detecting value generated by the strain gauge 110 is larger than the predetermined threshold value; if not, return to step S310, if so, step S330 is performed. In step S330, the piezo sensor 120 is activated. In step S340, the position being touched is reported.

Figure 4A:
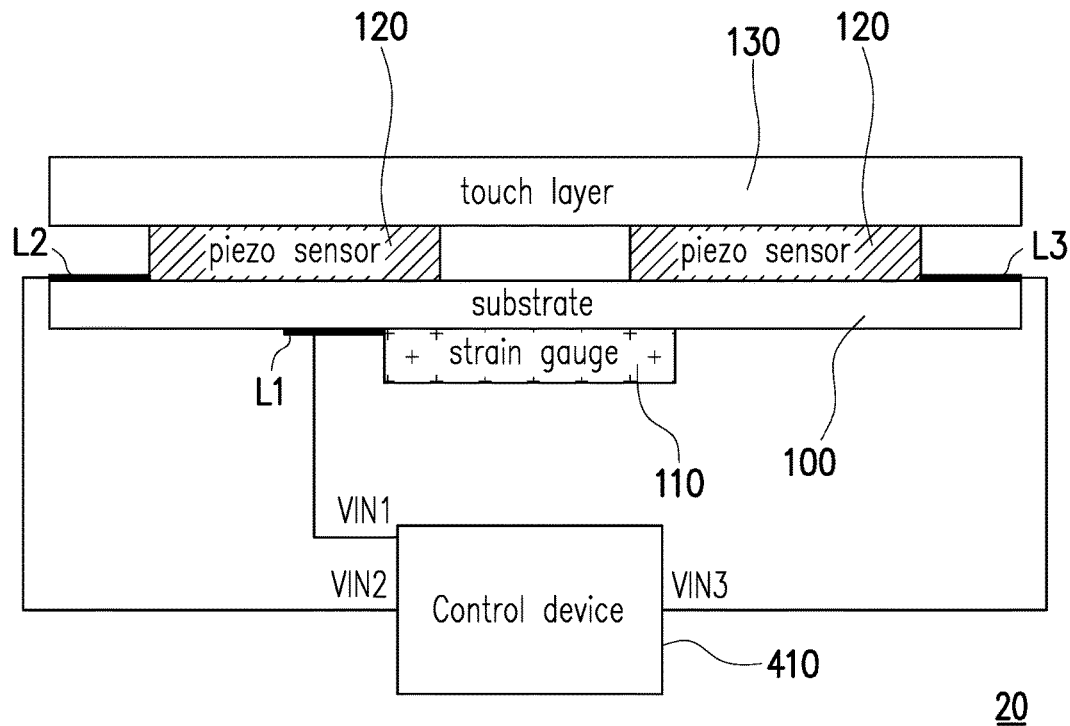
FIG. 4A is a schematic view of a touch sensor according to another embodiment of the invention.

Referring to FIG. 4A, FIG. 4A is a schematic view of a touch sensor according to another embodiment of the invention. In another embodiment, a touch sensor 20 includes the substrate 100, the strain gauge 110, the plurality of piezo sensors 120, the touch layer 130 and a control device 410. The substrate 100, the strain gauge 110, the plurality of piezo sensors 120 and the touch layer 130 are described above and thus no repetition is incorporated herein. In another embodiment, the control device 410 receives a strain detecting signal VIN1 generated by the strain gauge 110 and receives piezo detecting signals VIN2 and VIN3 generated by the piezo sensor 120, and the user's touch action is determined according to the value of the strain detecting signal VIN1, the piezo detecting signals VIN2 and VIN3.

Regarding the above, the strain detecting signal may be transmitted to the control device 410 through the conductive line L1 disposed on the substrate 100, thereby enabling the control device 410 to determine the amount of force applied by the user on the lateral side of the housing along z direction, and facilitating the control device 410 to determine the actual position where the force is applied by the user, wherein the z direction is perpendicular to a first plane.

Regarding the above, the piezo detecting signal may be transmitted to the control device 410 through conductive lines L2 and L3 disposed on the substrate 100, thereby enabling the control device 410 to determine the position where the force is applied by the user on the lateral side of the housing along x-y direction, wherein the x-y direction may be parallel with the second surface.

Figure 4B:
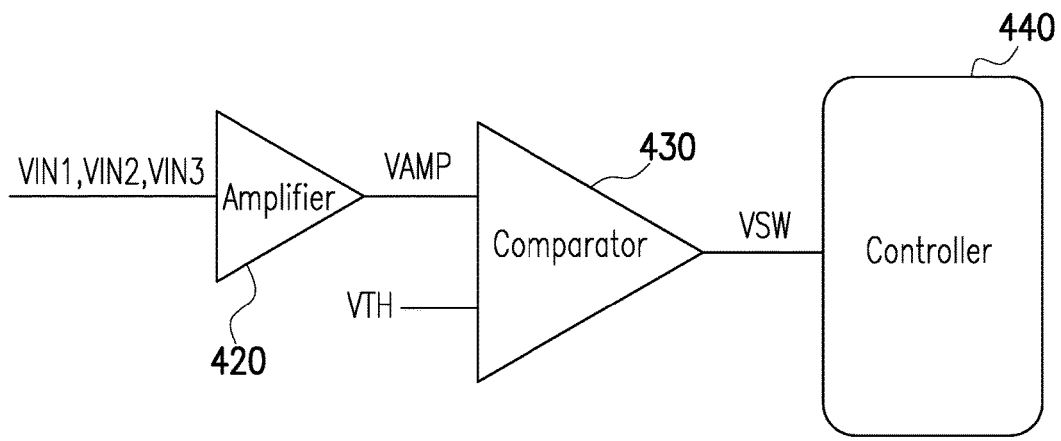
FIG. 4B is a circuit diagram of a control device according to another embodiment of the invention.

Regarding FIG. 4B, FIG. 4B is a circuit diagram of a control device according to another embodiment of the invention. In another embodiment, the control device 410 includes an amplifier 420, a comparator 430 and a controller 440. Moreover, the control device 410 may be disposed on the substrate 100 and may be disposed on other circuit board.

Referring to FIG. 4A and FIG. 4B, in another embodiment, the amplifier 420 is coupled to the strain gauge 110 and the piezo sensor 120 to receive the strain detecting signal VIN1, the piezo detecting signal VIN2 and the piezo detecting signal VIN3, and amplify the strain detecting signal VIN1, the piezo detecting signal VIN2 and the piezo detecting signal VIN3 to generate an amplifying signal VAMP. The amplifier is, for example, an operational amplifier, the invention provides no limitation to the type of the amplifier.

The comparator 430 is coupled to the amplifier 420 to receive the amplifying signal VAMP and a threshold voltage VTH for comparing the amplifying signal VAMP and the threshold voltage VTH, and generate a trigger voltage VSW according to the comparison result. The invention provides no limitation to the type of the comparator.

The controller 440 is coupled to the comparator 430 to receive the trigger voltage VSW, and utilize the trigger voltage VSW to realize touch operation. The controller 440 may be a central processing unit (CPU), a microcontroller (MCU), an application-specific integrated circuit (ASIC), a field programmable gate array (FPGA) or similar element or a combination of the above. The controller 440 is programmed to execute the following functions or steps.

In another embodiment, the touch sensor 20 may be used to replace the power key or volume key. Referring to FIG. 4A and FIG. 4B, the user applies a force on the touch layer 140 such that the strain gauge 110 is deformed to generate the strain detecting signal VIN1. The strain detecting signal VIN1 is amplified by the amplifier 420 to generate the amplifying signal VAMP. The comparator 430 receives the amplifying signal VAMP and compares the amplifying signal VAMP with the threshold voltage VTH. The threshold voltage VTH may be designed by a predetermined circuit (not shown), or the value of the threshold voltage VTH is stored in a memory (not shown) in advance. When the comparator 330 determines that the amplifying signal VAMP is larger than the threshold voltage VTH, the comparator 430 generates the trigger voltage VSW. The controller 440 receives the trigger voltage VSW to activate or close the power of the hand-held electronic apparatus 200 such that the touch sensor 20 may be used to replace the power key. In other embodiments, the controller 440 may be used to receive the trigger voltage to turn on/off or adjust the volume. The invention provides no limitation to the function that can be executed by the controller 440.

It should be indicated that, on different lateral sides of the hand-held electronic apparatus 200, the strain gauge 110 and the piezo sensor 120 may have different activating sequence. The invention provides no limitation to the activating sequence of the strain gauge 110 and the piezo sensor 120 when the hand-held electronic apparatus 200 is switched from the power-saving mode to the normal mode. Additionally, the activating sequence of the strain gauge 110 and the piezo sensor 120 on different lateral sides may be different.

For example, in the power-saving mode, on the right side of the hand-held electronic apparatus 200, the piezo sensor 120 is in activating status and the strain gauge 110 is in closed status. On the left side of the hand-held electronic apparatus 200, the strain gauge 110 is in activating status and the piezo sensor 120 is in closed status. When the piezo sensor 120 on the right side detects interaction between the user and the hand-held electronic apparatus 200 and the strain gauge 110 on the left side detects interaction between the user and the hand-held electronic apparatus 200, the hand-held electronic apparatus 200 is switched to the normal mode, and the strain gauge 120 on the right side is activated and the piezo sensor 110 on the left side is activated as well.

It should be mentioned that the design of combination of the strain gauge 110 and the piezo sensor 120 may further facilitate the control device 410 to perform self-calibration. The control device 410 may calibrate the error of different sensors according to the report of different sensors.

For example, in the normal mode, the strain gauge 110 detects the amount of force applied along the z direction and the piezo sensor 120 detects the position where the force is applied along the x-y direction. However, when the force-applying position detected by the piezo sensor 120 is erroneous, the maximum force-applying point detected by the plurality of strain gauges 110 may be used to calibrate the force-applying point. Likewise, when the amount of force detected by the strain gauge 110 is erroneous, the number of piezo sensor 120 which detects valid force may be used to calibrate the amount of force.

Figure 5:
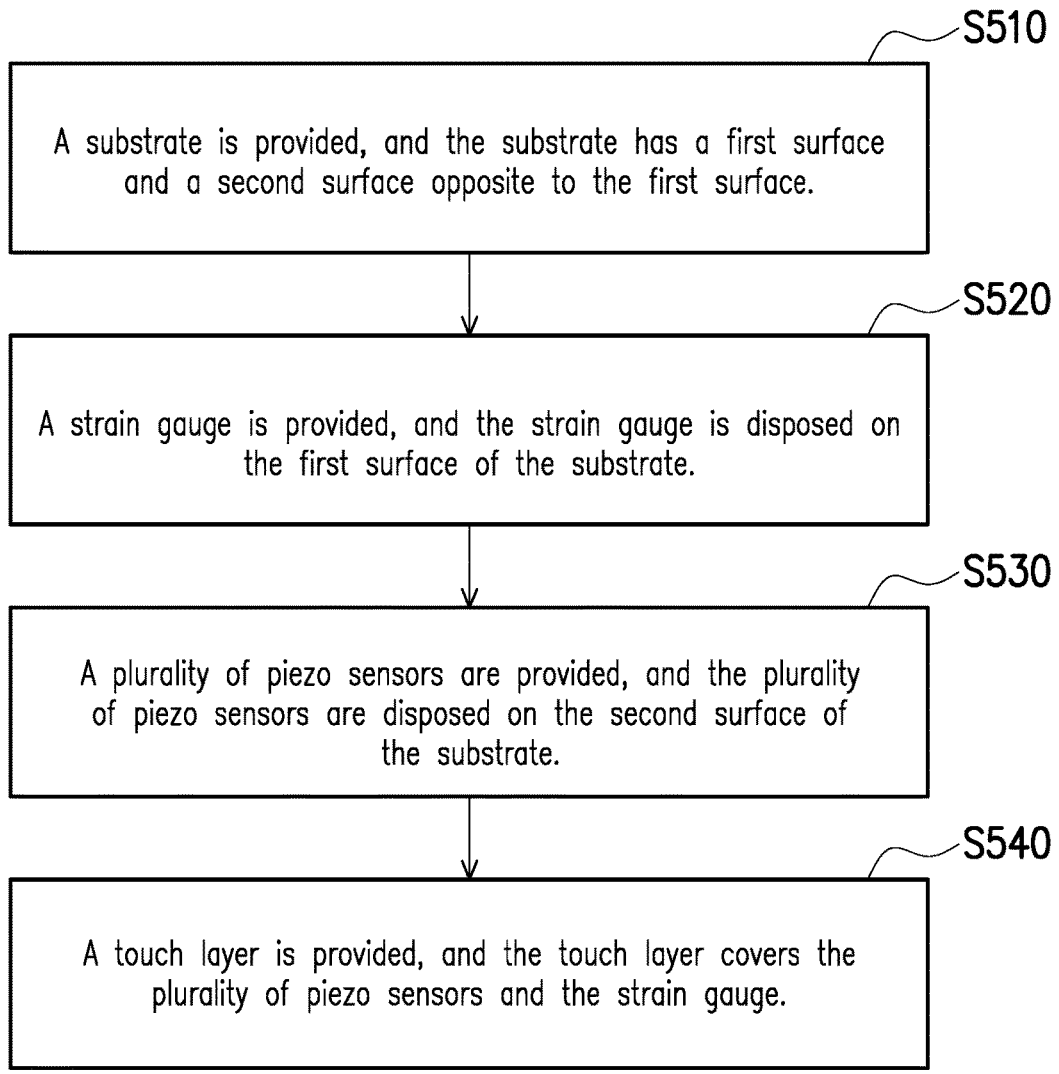
FIG. 5 is a diagram showing a flowchart of a touch detection method according to an embodiment of the invention.

Referring to FIG. 5, FIG. 5 is a diagram of a flowchart showing a touch detection method according to an embodiment of the invention. In step S510, the substrate is provided, and the substrate has the first surface and the second surface opposite to the first surface. In step S520, the strain gauge is provided, and the strain gauge is disposed on the first surface of the substrate. In step S530, the plurality of piezo sensors are provided, and the piezo sensors are disposed on the second surface of the substrate. In step S540, the touch layer is provided, and the touch layer covers the plurality of piezo sensors and the strain gauge.

The details of implementation of each step illustrated in FIG. 5 are provided in the above-mentioned embodiments and methods, and thus no repetition is incorporated herein.

In summary, according to the invention, the touch sensor has strain gauge and the plurality of piezo sensors. The strain gauge and the piezo sensors are respectively configured to detect touch pressure applied along different directions to provide effective touch detection result.

Although the invention has been disclosed by the above embodiments, the embodiments are not intended to limit the invention. It will be apparent to those skilled in the art that various modifications and variations can be made to the structure of the invention without departing from the scope or spirit of the invention. Therefore, the protecting range of the invention falls in the appended claims.

What is claimed is:

1. A touch sensor, comprising:
   a substrate, having a first surface and a second surface opposite to the first surface;
   a strain gauge, disposed on the first surface of the substrate;
   a plurality of piezo sensors, disposed on the second surface of the substrate; and
   a touch layer, covering the piezo sensors and the strain gauge,
   wherein each of the piezo sensors and the strain gauge are not overlapped with each other or partially overlapped with each other.

2. The touch sensor according to claim 1, wherein the substrate is a circuit substrate, the circuit substrate has at least one first conductive line and at least one second conductive line, the at least one first conductive line is disposed on the first surface of the substrate and coupled to the strain gauge, the at least one second conductive line is disposed on the second surface of the substrate and coupled to the piezo sensors.

3. The touch sensor according to claim 2, wherein the at least one first conductive line is configured to transmit a first detection result generated by the strain gauge, the at least one second conductive line is configured to transmit a second detection result generated by the piezo sensors.

4. The touch sensor according to claim 1, wherein the piezo sensors are not in contact with each other.

5. The touch sensor according to claim 3, further comprising:
   a control device, coupled to the at least one first conductive line and the at least one second conductive line, obtaining a touch status along a first direction and a second direction according to the second detection result, obtaining a touch status along a third direction according to the first detection result, wherein any two of the first direction, the second direction and the third direction are perpendicular to each other.

6. The touch sensor according to claim 5, wherein the control device is in a power-saving mode, turning off the piezo sensors and activating the strain gauge.

7. The touch sensor according to claim 6, wherein the control device enters a normal mode and activates the piezo sensors according to the first detection result of the strain gauge in the power-saving mode.

8. The touch sensor according to claim 5, wherein the control device comprises:
   an amplifier, coupled to the strain gauge to receive a detecting voltage, and amplifying the detecting voltage to generate an amplifying voltage;
   a comparator, coupled to the amplifier to receive the amplifying voltage, comparing the amplifying voltage and a threshold voltage; and
   a controller, coupled to the comparator;
   wherein the comparator generates a trigger voltage when it is determined that the amplifying voltage is larger than the threshold voltage.

9. A hand-held electronic apparatus, comprising:
   a housing; and
   a plurality of touch sensors as claimed in claim 1, disposed on at least one lateral side of the housing.

10. A touch detection method, comprising:
    providing a substrate, the substrate having a first surface and a second surface opposite to the first surface;
    providing a strain gauge, the strain gauge disposed on the first surface of the substrate;
    providing a plurality of piezo sensors, the piezo sensors disposed on the second surface of the substrate; and
    providing a touch layer, the touch layer covering the piezo sensors and the strain gauge,
    wherein each of the piezo sensors and the strain gauge are not overlapped with each other or partially overlapped with each other.

11. The touch detection method according to claim 10, further comprising:
    turning off the plurality of piezo sensors in a power-saving mode, and activating the strain gauge to perform a touch detection operation, and generating a first detection result.

12. The touch detection method according to claim 11, further comprising:
    in the power-saving mode, entering a normal mode according to the first detection result generated by the strain gauge, and activating the piezo sensors.

13. The touch detection method according to claim 10, further comprising:
    obtaining a touch status along a first direction and a second direction according to a second detection result generated by the piezo sensors; and
    obtaining a touch status along a third direction according to a first detection result generated by the strain gauge, wherein any two of the first direction, the second direction and the third direction are perpendicular to each other.

* * * * *